United States Patent [19]

Varieur

[11] Patent Number: 5,062,651
[45] Date of Patent: Nov. 5, 1991

[54] JOGGING BABY CARRIAGE

[76] Inventor: Michael J. Varieur, 25 Filors La., Stony Point, N.Y. 10980

[21] Appl. No.: 565,664

[22] Filed: Aug. 10, 1990

[51] Int. Cl.⁵ .............................................. B62D 51/04
[52] U.S. Cl. ..................................... 280/1.5; 280/484; 280/494; 280/47.25; 403/276
[58] Field of Search ........................ 280/1.5, 47.25, 63, 280/66, 71, 73, 79.2, 204, 292, 485, 494, 483, 484, 488, 489, 493, 499, 498, 64; 403/276, 284, 225

[56] References Cited

U.S. PATENT DOCUMENTS

| 660,598 | 10/1900 | Stonebridge . | |
|---|---|---|---|
| 2,343,019 | 2/1944 | Neal | 280/33.1 |
| 3,271,048 | 9/1966 | Beesley et al. | 280/204 |
| 3,328,043 | 6/1967 | Johnson | 280/1.5 |
| 3,907,325 | 9/1975 | Gaines et al. | 280/63 |
| 4,236,723 | 12/1980 | Lemmon | 280/1.5 |
| 4,306,733 | 12/1981 | Cox | 280/204 |
| 4,671,522 | 6/1987 | Fragione | 280/63 |
| 4,695,072 | 9/1987 | Brooks | 280/47.25 |
| 4,838,565 | 6/1989 | Douglas et al. | 280/1.5 |
| 4,848,780 | 7/1989 | Straub | 280/1.5 |

FOREIGN PATENT DOCUMENTS

| 0013152 | 4/1929 | Australia | 280/47.25 |
|---|---|---|---|
| 8600054 | 1/9186 | World Int. Prop. O. | 280/1.5 |

Primary Examiner—Kenneth R. Rice
Assistant Examiner—Anne Marie Boehler
Attorney, Agent, or Firm—Bryan, Levitin, Franzino & Rosenberg

[57] ABSTRACT

A carriage which can be towed by a person during jogging or walking, and for receiving a child to be taken along during the person'exercise, comprises a foldable frame supported on a pair of rotatably mounted wheels. A tow bar is connected to the frame and extends forwardly to a suspension bar which is connected to the frame by flexible cords. A belt is connected to opposite ends of the suspension bars to be worn by the person. The suspension bar avoids the transmission of erratic movements from the person to the carriage.

11 Claims, 1 Drawing Sheet

JOGGING BABY CARRIAGE

FIELD AND BACKGROUND OF THE INVENTION

The present invention relates in general to towed trailing vehicles, and in particular to a new and useful running carriage which is meant to be coupled to the torso of a person who is jogging or walking so that a child sitting in the carriage can be taken along during exercise sessions.

Heretofore, a jogger who was responsible for a small child had few options when seeking exercise. The jogger would either have to secure the services of a babysitter or utilize a conventional carriage which the jogger pushed while jogging. This arrangement is quite unstable however and, at the very least, required the jogger to jog slowly.

A wide variety of sulkies are known which comprise a frame for receiving a seated individual, and a pair of wheels rotatably mounted to the frame. A tongue or towing bar extends forwardly of the frame and can be engaged to a variety of draft mechanisms such as horses in the case of the sulkies used for racing, bicycles, motor vehicles such as motor cycles, or even human beings in the case of a rickshaw.

A two wheeled buggy for receiving an occupant and meant to be towed by bicycle is disclosed in U.S. Pat. No. 4,306,733 to Cox and U.S. Pat. No. 3,271,048 to Beesley. A two-wheeled trailer for hauling a load using a motorcycle is disclosed by U.S. Pat. No. 2,343,019 to Neal. A one-wheeled vehicle to be towed by a bicycle is also disclosed by U.S. Pat. No. 660,598 to Stonebridge. Carriages to be towed by an individual and for carrying a specific or generalized load is disclosed in U.S. Pat. No. 328,043 to Johnson and U.S. Pat. 4,838,565 to Douglas et al.

Where a carriage for receiving a child is to be towed by a running or walking individual, although the sulky or rickshaw configuration is appropriate, special consideration is required beyond the insights provided by the above-identified patents.

Firstly, because the carriage will have to be stored in a residential setting, thought should be given to making the carriage collapsible and compact for storage. It is also important to avoid transmitting the valiant movements of the jogger to the child sitting in the carriage. This too has not been fully addressed by the prior art.

SUMMARY OF THE INVENTION

An object of the present invention is to provide a carriage which can be towed by a person during jogging and walking, comprising a frame, two wheels rotatably mounted to the frame for allowing the frame to roll across the ground, a seat connected to the frame for supporting a child, at least one tow bar having one end connected to the frame and an opposite end, torso engaging means adapted to be connected to a person and being connected to the opposite end of the tow bar, and flexible motion suppression means connected between the torso engaging means and the tow bar for pulling the frame while suppressing the transmission of erratic horizontal and vertical, transverse and lateral movements from the torso engaging means to the frame.

Another object of the present invention is to provide a jogger or walker with means to safely and effectively bring a small child along while exercising.

Another object of the invention is to keep a parent and child together during exercise, thus setting a good example of fitness for the child while at the same time spending valuable time with the child which is becoming increasingly difficult in today's busy world.

A still further object of the invention is to provide a carriage which, when not occupied by a child, can be used to carry a number of small parcels, for example between a store and a person's residence.

Another object of the invention is to provide a carriage which can be towed by a person without applying excess and unnatural stress to the person such as that applied, for example, by a baby carrying backpack or other baby supporting devices used to carry a baby while a person jogs.

A still further object of the invention is to provide a baby carriage which can be towed by a jogging or walking person, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention are illustrated.

DESCRIPTION OF THE PREFERRED EMBODIMENTS

Figure 1:
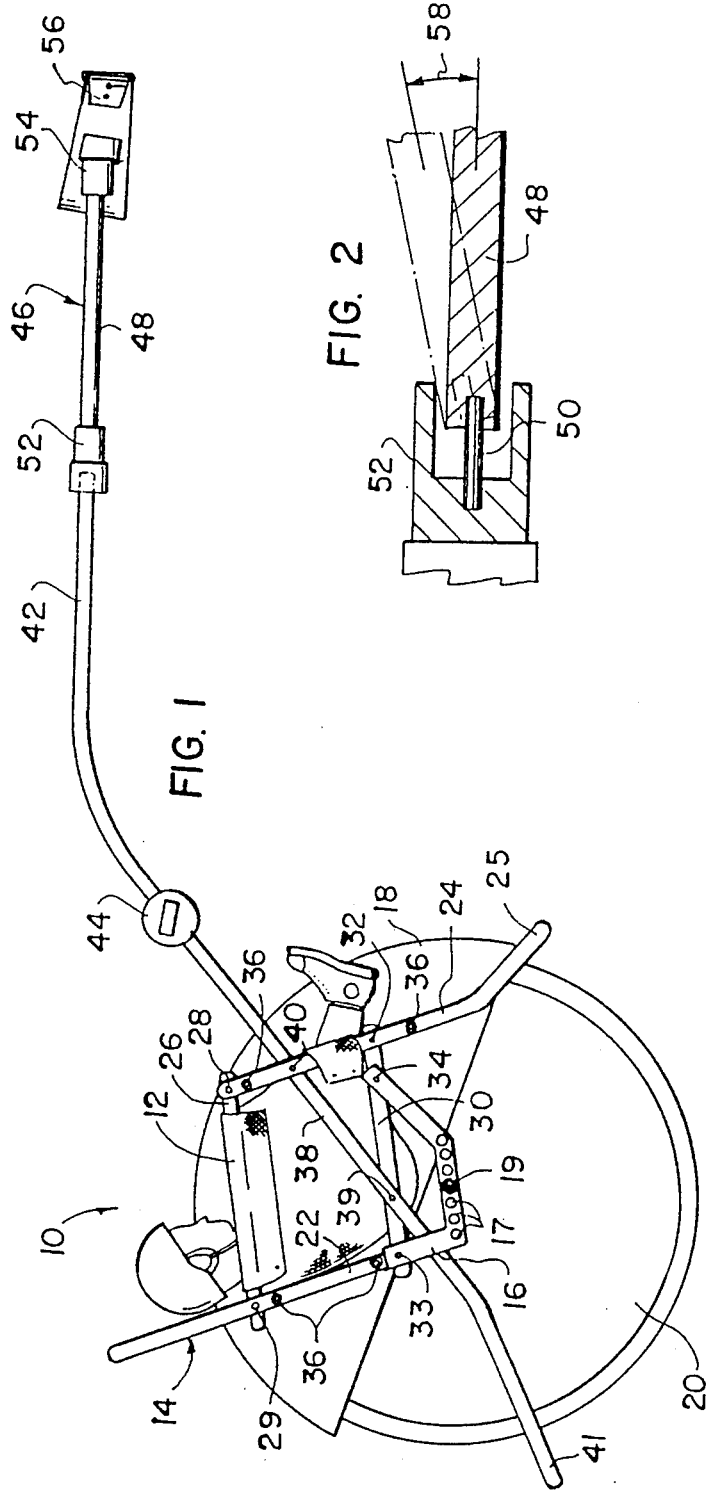
FIG. 1 is a side elevational view of a carriage to be pulled by a jogger, with one wheel removed.

Referring to the drawings in particular, the invention embodied therein comprises a carriage generally designated 10, for carrying a child in a fabric sling like seat 12 which is supported in a frame 14. A pair of wheels are rotatably mounted to frame 14 on brackets 16 connected to the opposite sides of frame 14. A light-weight plastic fender 18 which is advantageously connected to the opposite sides of frame 14 by snaps 36, covers the top portion of each wheel 20 to protect the child in the seat and to protect the jogger from flying debris which is picked up by the wheels.

FIG. 1 shows frame 14 in its unfolded and use position. Frame 14 comprises a pair of identical portions on opposite sides of the frame. For this reason only one side of the frame will be described in detail. Seat 12 is suspended between the two sides of the frame. The side of frame 14 shown in FIG. 1, comprises a rear member 22 which forms the incline back of the seat, and a front member 24. An upper member 26 is pivotally mounted at pivot connections 28 and 29 between upper portions of the rear and front members 22, 24. A flap of sling seat 12 is wrapped over and supported on the upper member 26.

A lower member 30 is connected at pivot connections 32 and 33 to lower portions of the rear and front members.

U-shaped bracket 16 is detachably connected at pivot connection 33 and an additional connection 34 to the lower member 30. This can be achieved by a nut and bolt combination, by use of a cotter pin or any other conventional connecting mechanism.

The fender is connected on the side of frame 14 which is visible in FIG. 1, by snaps which are fixed to the rear and front members, at widely spaced positions. Any other detachable connection can also be utilized for connecting the fenders.

In order to centrally support the center of gravity of the child-plus-frame combination, a plurality of holes 17 are provided across the bottom of U-shaped bracket 16. One of these holes contains an axle and connector 19 which rotatably supports the wheel on that side of the frame. This may simply be an elongated bolt with bushing for extending through a hub of the wheel, and a nut for holding the wheel on the bushing. To shift the center of gravity of the child plus frame combination, the axle 19 may be shifted into rearward or forward ones of the holes 17. This shifts the center of gravity respectively forwardly and rearwardly, so that the child is evenly balanced within the carriage.

In order to maintain the foldable frame in the position shown in FIG. 1, and also in order to establish a connection between the carriage and the jogger, a tow bar 38 is connected by a permanent pivot connection 39 to lower member 30, and a detachable connection, such a cotter pin 40, to the front member 24. A forward bar portion 42 is connected to the tow bar 38 by a connection 44, such as a pair of discs on opposite sides of the tow bar 38 and forward bar portion 42, which can be tightened and loosened to change the angle between tow bar 38 and forward bar portion 42. This adjustment takes into account different heights of different joggers. In this way, the child sitting in seat 12 can be maintained at a correct orientation despite the height of the jogger.

Figure 3:
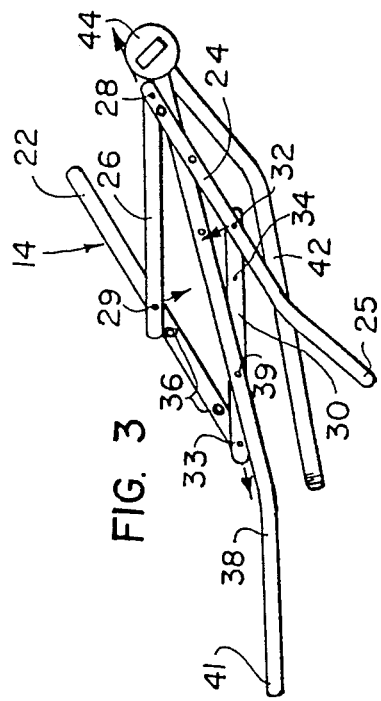
FIG. 3 is a side elevational view of the carriage frame in a partially folded condition and with the wheels and motion suppression mechanism removed.

The adjustable connection 44 can also be loosened to pivot forward bar portion 42 so that it is almost parallel with the tow bar 38 as shown in FIG. 3, to fold the frame into its storage position.

In order to fold frame 14 into the position shown in FIG. 3, the detachable connection or cotter pin 40 is removed which disconnects tow bar 38 to front member 24. This permits the pivot connections 28, 29, 32, 33 and 39 to move in the directions of the arrows in FIG. 3, to fold the frame.

To keep the frame in its unfolded use position as shown in FIG. 1, the single detachable pivot connection 40 is sufficient.

In the folded position of FIG. 3, bracket 16 and their associated wheels have been removed as have fenders 18. These structures can be stored separately.

As a safety feature, to prevent the child from pivoting too far around the rotation axis of the wheels, front member 24 has a front strut 25 which extends forwardly and downwardly of the frame. In likewise fashion, tow bar 38 has a rearwardly and downwardly extending strut 41. In this way, even if the forward bar portion 42 is allowed to drop, the child will only pivot a small amount forwardly or rearwardly until one of the struts strikes the ground.

Figure 2:
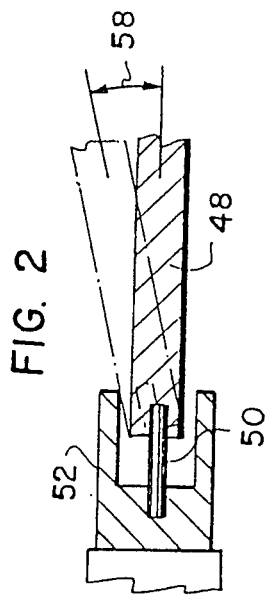
FIG. 2 is an enlarged sectional and fragmentary view of part of a motion suppression mechanism for connecting the jogger to the carriage.

Since jogging movements are rather erratic and include both vertically and horizontally components, a motion suppression mechanism 46 is connected to an end of the forward bar portion 42 which is remote from the frame. As shown in FIGS. 1 and 2, the suppression mechanism comprises a suppression bar 48 which is connected by a flexible nylon cable or cord 50 to a cup-shaped fitting 52 which is fixed, for example by an internal thread, to the end of bar portion 42 which has an external thread.

The opposite end of suppression bar 48 is connected in the same way to a cup-shaped fitting 54 which is connected, in turn, to a belt 56 to be worn by the jogger. In the preferred embodiment of the invention, a pair of suppression bars 48 are connected at fittings 54 to the opposite sides of belt 56. Alternatively, a single suppression bar may be mounted between the back of belt 56 and a cross bar interconnecting the forward bar portions 42 on opposite sides of the frame 14.

As shown in FIG. 2, since an end of suppression bar 48 extends into the recess of the cup-shaped fitting 52, bar 48 can only pivot by a maximum angle 58 either upwardly, downwardly or to the sides, with respect to the forward bar portion 42. This angle is advantageously plus or minus 10° and extends both horizontally and vertically.

The synthetic axially extending flexible cord or member 50 is advantageously glued or otherwise fixed into blind bores in fittings 52 and suppression bar 48.

In order to support a front lower edge of the sling seat 12, a cross piece extends between the frame halves on the axis of pivot connection 32. A front flap of the seat is wrapped around this cross piece.

In likewise fashion, a cross piece connects the top of the two rear members 22 which are on the back of the frame. A flap at the top of the sling seat is wrapped around this cross piece to support the top of the seat.

While a specific embodiment of the invention have been shown and described in detail to illustrate the application of the principles of the invention, it will be understood that the invention may be embodied otherwise without departing from such principles.

What is claimed is:

1. A carriage for receiving a child to be towed by a person during jogging and walking, comprising:
    a frame;
    at least two wheels rotatably mounted to said frame for rolling on the ground;
    a seat for receiving a child connected to and supported by said frame;
    torso engaging means adapted to be connected to a person to tow the carriage;
    at least one tow bar having one end connected to said frame, and an opposite end; and
    flexible motion suppression means connected between the opposite end of said tow bar and said torso engaging means for pulling said frame while suppressing the transmission of erratic vertical and horizontal movement from said torso engaging means to said frame, said motion suppression means comprises a suppression bar, a cut-shaped fitting connected to the opposite end of said tow bar, an axially extending flexible member connected to said flexible member being said fitting, said flexible member and an end of said suppression bar connected to said flexible member being positioned within said fitting for restricting a maximum angle of motion between said suppression bar and said tow bar in any direction around said fitting.

2. A carriage according to claim 1, wherein said torso engaging means comprises a belt.

3. A carriage according to claim 1, wherein said flexible member comprises a flexible cord.

4. A carriage according to claim 1, wherein said frame is foldable.

5. A carriage according to claim 4, wherein said frame comprises spaced apart forward and rear members, spaced apart upper and lower members pivotally connected at pivot connections to said rear and forward members, a sling seat carried by said frame for supporting a child, and a bracket connected to said lower member for rotatably connecting one of said wheels to said frame, said tow bar being pivotally mounted between said lower member and said front member.

6. A carriage according to claim 5, wherein said tow bar includes a rearwardly and downwardly extending rear strut whereby said frame can pivot about said wheels to only a limited extent rearwardly until said rear strut strikes the ground.

7. A carriage according to claim 6, wherein said forward member includes a downwardly and forwardly extending front strut whereby said frame can pivot about said wheels to only a limited extend forwardly until said front strut strikes the ground.

8. A carriage according to claim 7, wherein said tow bar comprises a rearward bar portion and a forward bar portion adjustably connected to said rearward bar portion for extending at a variable and fixable angle with respect to said rearward bar portion, said rearward bar portion being connected to said forward member at an intermediate location between the pivot connections of said forward member, said rearward bar portion being pivotally connected to said lower member at an intermediate location between said pivot connections of said lower member.

9. A carriage according to claim 8, wherein said bracket is U-shaped, said bracket being connected to said lower member on opposite sides of a pivotal connection between said rearward bar portion and said lower member, said bracket including a plurality of holes therethrough spaced along said bracket in a front-to-rear direction, one of said wheels being rotatably connected to said bracket in a selected one of said holes, for adjusting a bearing location of the frame on said one of said wheels.

10. A carriage according to claim 5, wherein said tow bar is connected to said front member by a removable connection which is removable to allow said frame to fold.

11. A carriage according to claim 5, wherein said tow bar includes a forward bar portion and an adjustable pivot connection for adjusting an angle between said front bar portion and a remainder of said tow bar to raise and lower said torso engaging means with respect to said frame.

* * * * *